United States Patent
Burgdorf et al.

[11] Patent Number: 5,141,295
[45] Date of Patent: Aug. 25, 1992

[54] BRAKE POWER BOOSTER WITH DIAPHRAGM POSITION SENSING DEVICES

[75] Inventors: Jochen Burgdorf, Offenbach Pumpenheim; Hans-Dieter Reinartz, Frankfurt am Main; Helmut Steffes, Hattersheim; Peter Volz, Darmstadt, all of Fed. Rep. of Germany

[73] Assignee: Alfred Teves GmbH, Frankfurt am Main, Fed. Rep. of Germany

[21] Appl. No.: 445,605

[22] PCT Filed: Mar. 31, 1989

[86] PCT No.: PCT/EP89/00347

§ 371 Date: Dec. 19, 1989

§ 102(e) Date: Dec. 19, 1989

[87] PCT Pub. No.: WO89/10862

PCT Pub. Date: Nov. 16, 1989

[30] Foreign Application Priority Data

May 9, 1988 [DE] Fed. Rep. of Germany ....... 3815768
May 9, 1988 [DE] Fed. Rep. of Germany ....... 3815769

[51] Int. Cl.⁵ .................... B60T 8/40; B60T 8/44; B60T 13/52
[52] U.S. Cl. .................. 303/113 TB; 303/113 SS; 303/114 PN; 92/5 R; 91/1; 200/83 R; 188/1.11
[58] Field of Search .......... 303/113, 114, 119, 113 SS, 303/113 TB, 114 PN; 188/356, 357, 1.11; 60/545; 92/5 R; 91/1, 376 R; 340/452, 453; 200/83 R, 83 J, 83 N, 83 Q, 83 SA, 82 C, 82 E, 543, 545, 546

[56] References Cited

U.S. PATENT DOCUMENTS

| | | | |
|---|---|---|---|
| 2,914,630 | 11/1959 | Ralston | 92/5 R |
| 3,298,466 | 1/1967 | Ayers, Jr. et al. | 92/5 R |
| 3,703,620 | 11/1972 | Watanabe | 200/543 |
| 3,937,912 | 2/1976 | Martin | 200/82 C |
| 4,140,045 | 2/1979 | Hardwick et al. | 92/5 R |
| 4,508,008 | 4/1985 | Belart | 91/460 X |
| 4,580,847 | 4/1986 | Burgdorf | 303/119 X |
| 4,583,071 | 4/1986 | Sebalos et al. | 340/453 |
| 4,617,855 | 10/1986 | Wrobleski et al. | 92/5 R |
| 4,653,813 | 3/1987 | Burgdorf | 303/113 SS X |
| 4,709,126 | 11/1987 | Miller et al. | 92/5 R X |
| 4,804,235 | 2/1989 | Matsumura | 303/24.1 X |
| 4,826,255 | 5/1989 | Volz | 60/545 X |
| 4,828,332 | 5/1989 | Lohberg | 303/9.61 X |

*Primary Examiner*—Robert J. Oberleitner
*Assistant Examiner*—Josie A. Ballato
*Attorney, Agent, or Firm*—Robert P. Seitter; J. Gordon Lewis

[57] ABSTRACT

In an anti-lock brake control system having a vacuum brake power booster and a tandem master cylinder, in which the brake pedal is controlled to be positioned forwardly of the initial return position during the anti-lock control mode. This is achieved by variation of the rate of delivery of an auxiliary pump as by switching the pump motor on and off by a switch actuated by the diaphragm of the power booster to provide a signal of the pedal position at the start of an anti-lock control phase. Various switching arrangements described include a Bowden-cable pulled by the diaphragm, a mechanical or an optical switch actuated by the rolling lip of the diaphragm, or an approach switch detecting the approach of the diaphragm and cam-assembly. The core (53) of the Bowden cable (54) is connected with the diaphragm plate (52) of the vacuum brake power booster. The core (53) moves the trigger cam (64). The switch (18) is actuated by the movement of the trigger cam (64).

13 Claims, 5 Drawing Sheets

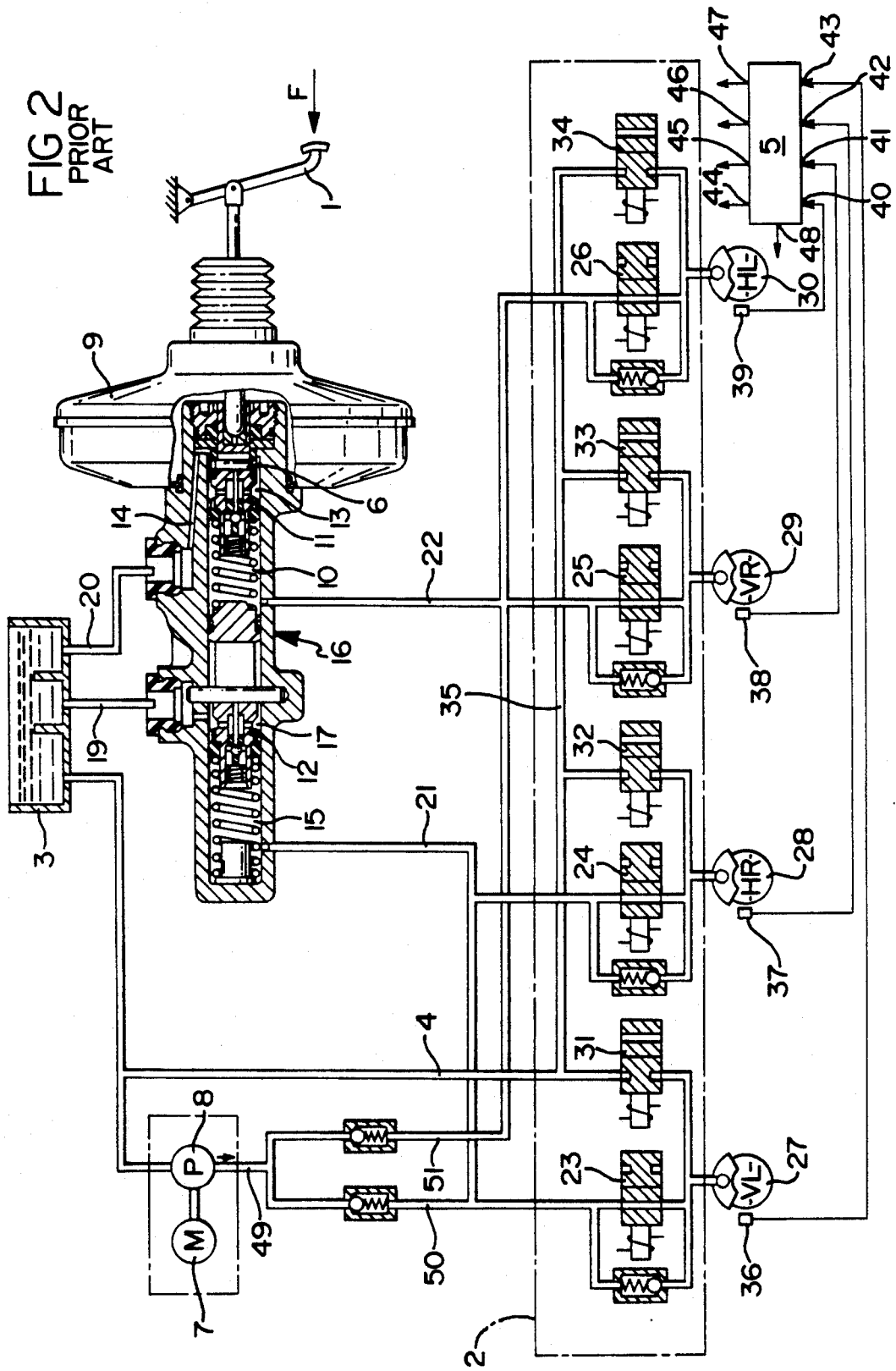

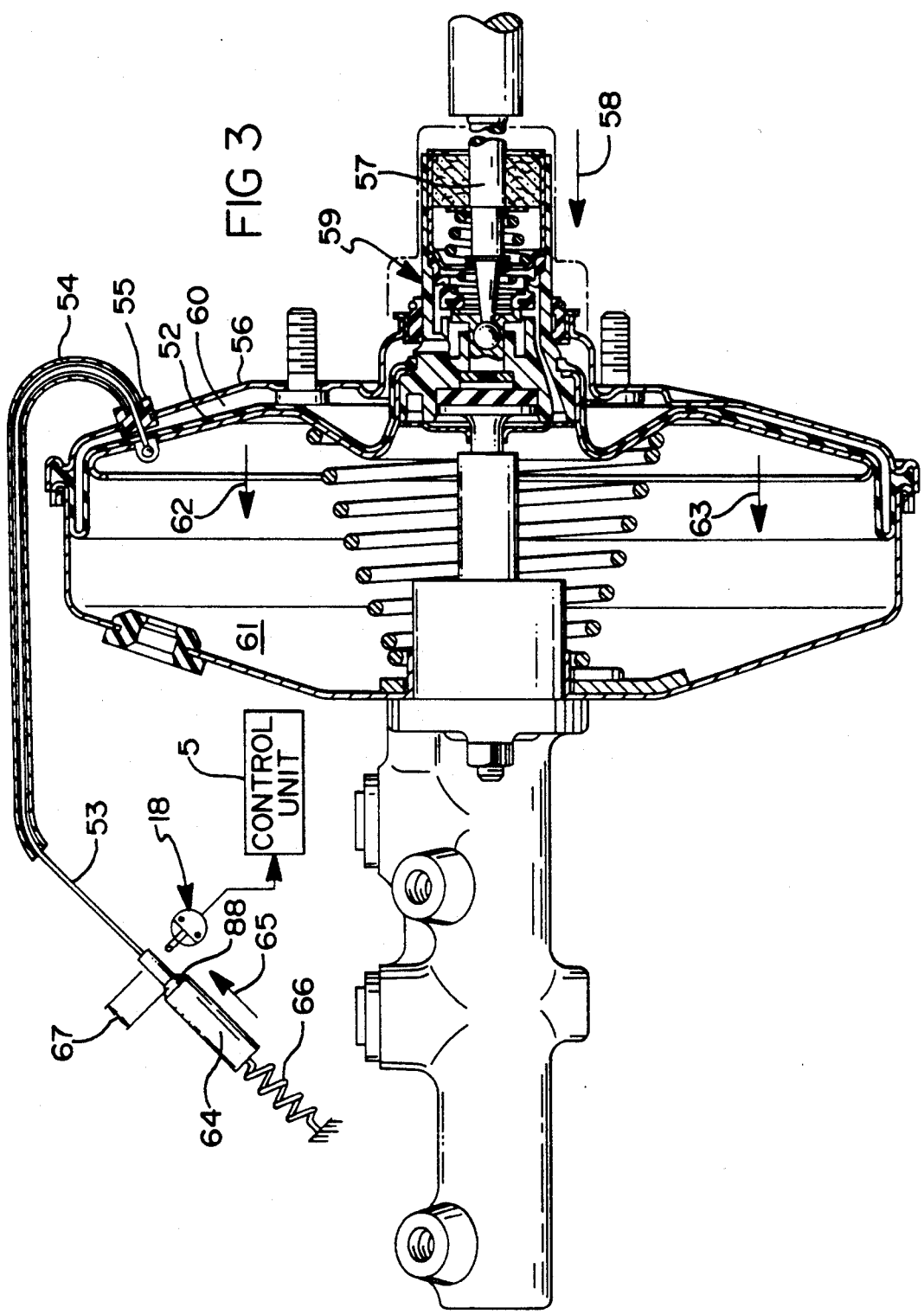

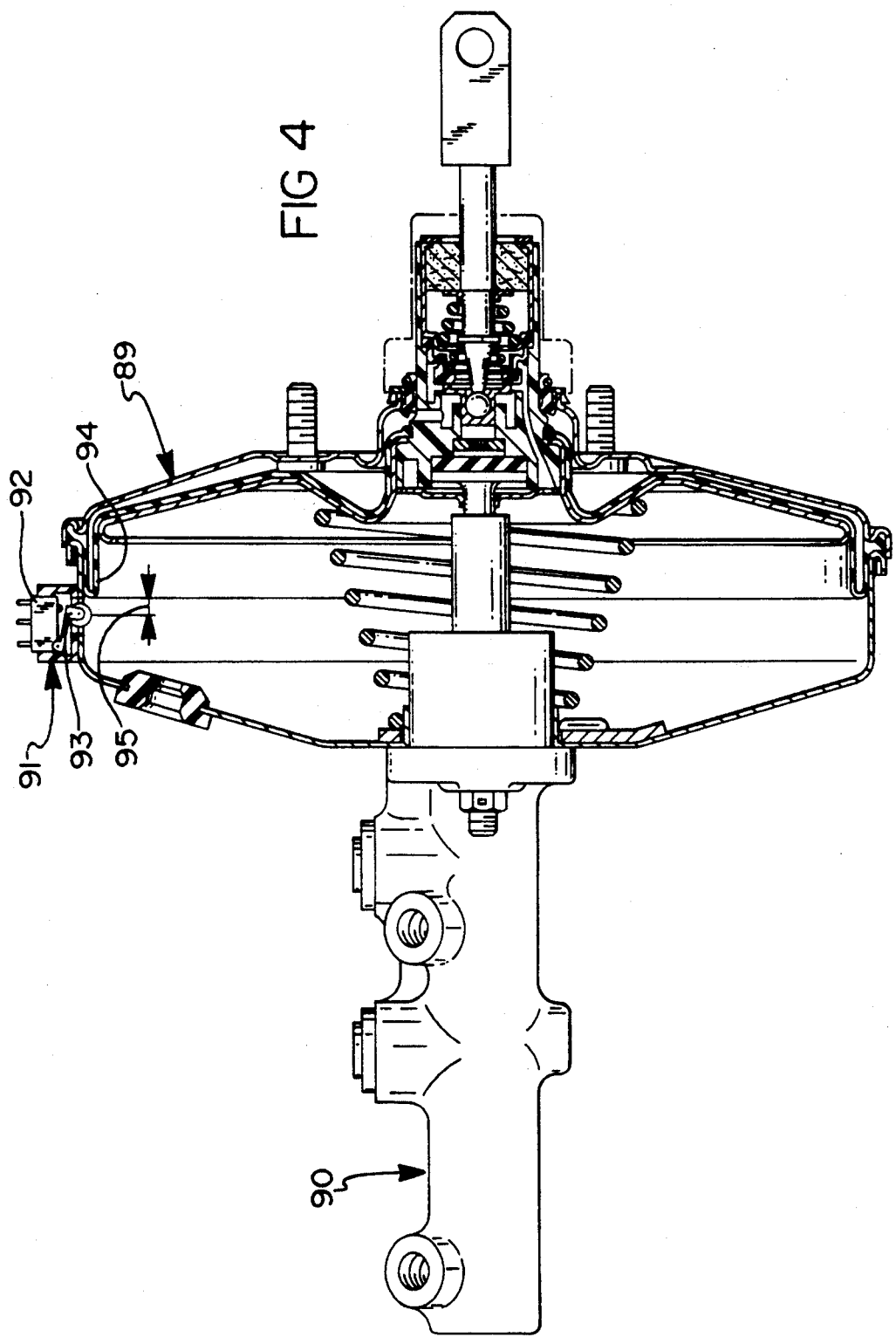

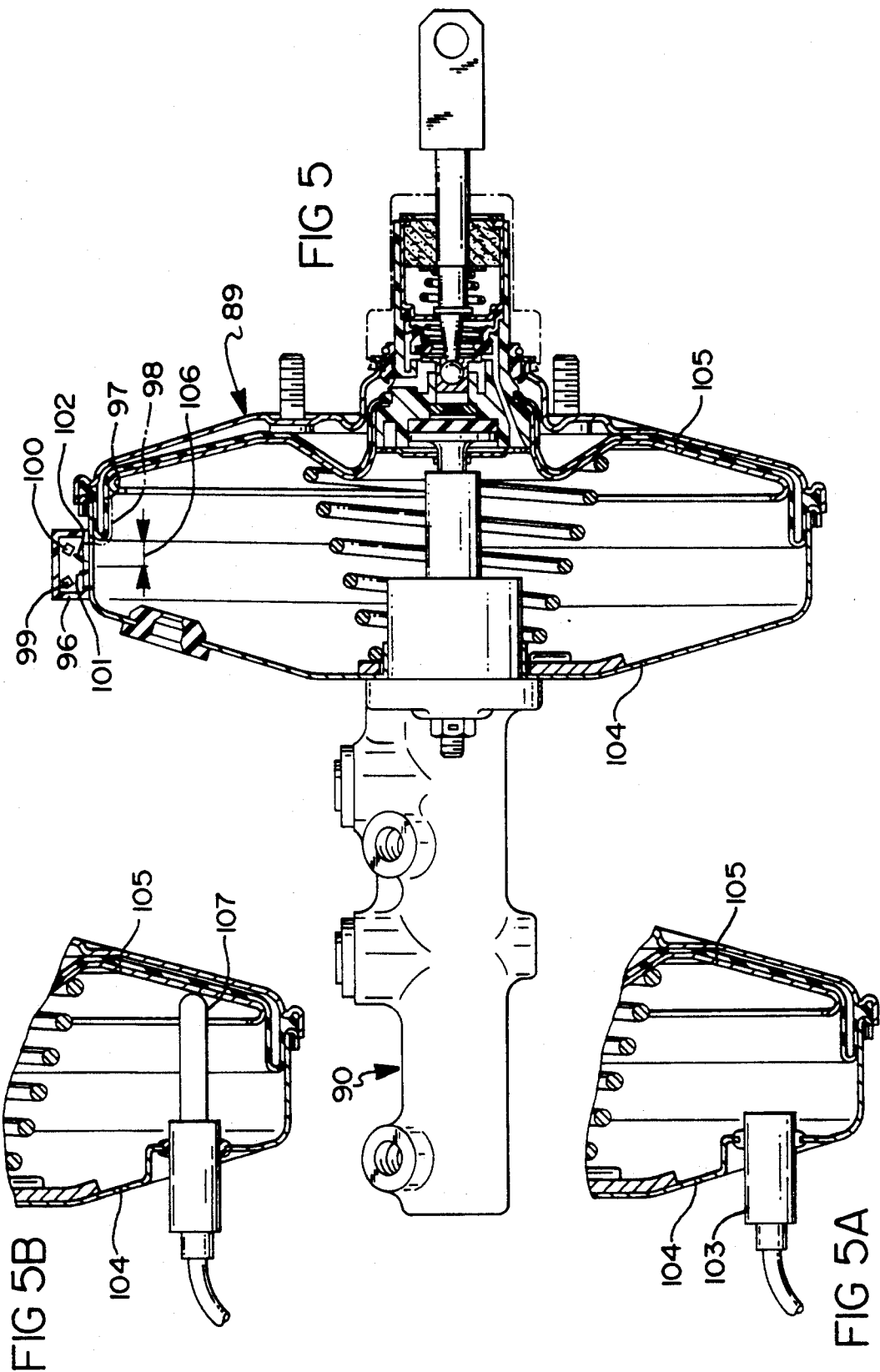

BRAKE POWER BOOSTER WITH DIAPHRAGM POSITION SENSING DEVICES

BACKGROUND OF THE INVENTION

The present invention relates to a braking pressure control device, in particular an anti-lock control device (ABS-device), and a traction slip control device (ASR-device), for automotive vehicles. The device comprises a master cylinder, wheel cylinders, at least one pump for positioning at least one piston of the master cylinder, a pressure modulator modulating the pressure in the wheel cylinders during the control mode, and an electronic control unit processing the wheel sensor signals to corrective signals for the opening valves and shut-off valves of the pressure modulator. The device further comprising a brake power booster, in particular a vacuum brake power booster which comprises a housing, a piston element, in particular a diaphragm plate, and a diaphragm, such as a rolling diaphragm, which interconnects the piston element and the housing in a sealing manner, and which permits movements of the piston element in relation to the housing, with the piston element being in operative engagement with the brake pedal.

Anti-lock systems are used in the motor vehicle industry in increasingly large numbers. In certain specific applications of these anti-lock systems, hydraulic pumps are used for generating an auxiliary pressure during the control mode. Such an anti-lock device has been described, for example, in German patent application P 3731603.6, corresponding to U.S. Pat. No. 4,826,255.

U.S. Pat. No. 4,826,255 discloses a brake system, in particular for automotive vehicles, comprising a master cylinder, wheel cylinders and a device for anti-lock control. In this brake system, there is provided a pressure-fluid source, in particular a pump, for positioning the piston of the master cylinder in a desired position during the anti-lock control mode. The rate of delivery of the pump is variable, and communicated by way of a hydraulic line with the master cylinder to be able to position the piston in accordance with its rate of delivery.

The present invention has the following objects: It is particularly desired that the brake pedal be positioned forward of an initial, fully retracted position in a particularly simple way during the anti-lock or traction slip control mode. The position of the push rod piston of the master cylinder sets the desired position of the brake pedal forward of its initial position. The further objects of the present invention are to provide an arrangement providing for the stroke of the push rod piston to be defined by a switch which does not enlarge the overall length of the entire assembly, composed of a vacuum brake power booster and master cylinder.

SUMMARY OF THE INVENTION

These and other objects are achieved by this invention in that there is provided a switch operator associated with the power booster diaphragm. In the first embodiment, a switch operator comprises element transmitting a tractive or pulling force, in particular a flexible transmitter or "Bowden" cable, which is coupled to the diaphragm support plate and which actuates a switch controlling the pump, by way of the electronic control unit. Another inventive switching arrangement used in a vacuum brake power booster of the type referred to resides in that the housing, the piston element, in particular the diaphragm plate, and the diaphragm, preferably a rolling diaphragm, are formed as component parts of a travel-responsive switch for the control of the pump, by way of the electronic control unit.

A particularly simple embodiment of this invention resides in that there is provided a travel-responsive switch and a member movable by the Bowden cable core and including a switching ramp which actuates the switch after a predetermined distance has been covered. Also, a cam can be provided which actuates the switch after a specific distance has been covered. In another embodiment, the housing incorporates a limit switch, preferably a mechanical limit switch with roller-type lever which is actuatable by the rolling diaphragm and provides an electric signal for the control of the pump. In a further embodiment, the housing incorporates a magnetic limit switch, especially with a reed contact, which is actuatable by the rolling diaphragm that is magnetized or is furnished with a magnetized material, at least in a section thereof. In another embodiment a photo-electric switch is provided in the housing, in particular in the form of a light barrier, which is actuatable by the rolling diaphragm, and a reflection light barrier arrangement is provided, and the rolling diaphragm is at least partially designed as a reflector.

Furthermore, the present invention can be embodied in an arrangement wherein an inductive sensor is arranged in the housing which issues an electric signal when the rolling diaphragm approaches. A capacitive sensor provides an alternative embodiment relative thereto.

The diaphragm plate of the brake power booster can be provided as part of a travel-responsive switch to the effect that an approach sensor is placed in the housing which scans the position of the diaphragm plate. An inductive approach switch or a capacitive approach switch can be used. As will become apparent, the overall dimensions of the entire device consisting of vacuum booster and tandem master cylinder are no more than those of devices of a conventional type of construction.

BRIEF DESCRIPTION OF THE DRAWING

Further details of this invention can be gathered from the following detailed description of an embodiment when taken in conjunction with the accompanying drawing in which:

FIG. 2 is a hydraulic circuit diagram an anti-lock brake system with a partially sectional view of a vacuum brake power booster incorporated in the system;

FIG. 3 is an enlarged partially sectional view of a vacuum power booster incorporating a first embodiment of a switching arrangement used in an anti-lock system according to FIG. 2; and, FIGS. 4 and 5 are enlarged, partially sectional views of vacuum power boosters incorporating a second and a third embodiment of the switching arrangements used in the anti-lock brake system according to FIG. 2.

FIGS. 5A and 5B are fragmentary sectional views of the booster housing showing additional alternate switching arrangements.

DETAILED DESCRIPTION

Figure 1:
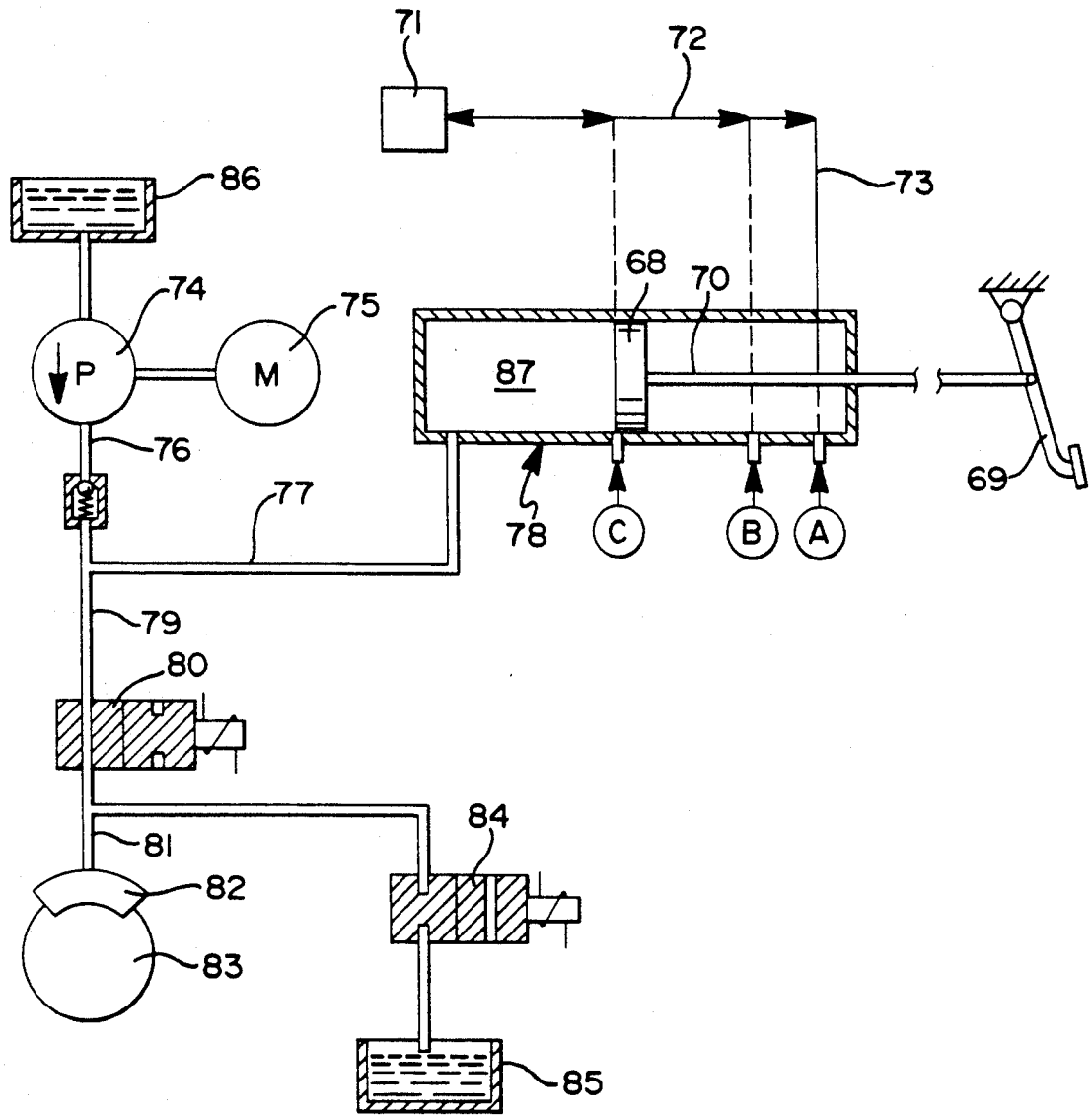
FIG. 1 is a schematic representation of an anti-lock braking system.

FIGS. 1 and 2 show devices and components, the design and mode of operation of which are described in the U.S. Pat. No. 4,826,255 cited hereinabove. The embodiments according to FIGS. 3 and 4 are incorporated in the system described in FIGS. 1 and 2. Therefore, it is necessary to explain the FIGS. 1 and 2 for a complete understanding of the embodiments according to FIGS. 3 and 4.

A master cylinder 78 with a piston 68 is illustrated schematically in FIG. 1. What is shown is a mono-type master cylinder. In a tandem-type master cylinder, the subsequently described operations apply in a corresponding fashion for the push rod piston. In the normal braking mode, the piston 68 is moved by the brake pedal 69 and the piston rod 70 out of the initial or inactive position A to the left. Numerals 71, 72, 73 designate in FIG. 1 components of a sensing device which ascertains the positions, the direction of movement and the velocity of the piston 68 and which supplies these data as electric sensor signals to an electric control unit which is described in the noted patent 4,826,255. Further details of the sensing device can be had from the cited patent.

Illustrated in FIG. 1 are three positions A, B, C of the piston 68 which are ascertained by the sensing device. The position A is the right-hand end return or initial position of the piston. The position B is the nominal position of the piston to control during the anti-lock control mode. Position C is the left-hand end, fully advanced position of the piston 68. A hydraulic pump 74 is driven by the electric motor 75. Pump 74 has a variable rate of delivery. Variation of the rate of delivery can be performed by electric means, as is depicted for instance in the description of the cited patent. However, the rate of delivery also can be performed by mechanical means, as is explained in the above cited patent. Finally, control of the rate of delivery of the pump can be effected by actuation of one or more clutches which are arranged between the drive motor 75 and the pump 74 or which are arranged inside the pump 74 and which are operated by the output signals of the electronic control unit.

The pump 74 is connected by way of the lines 76, 77 with the master cylinder 78 and by way of the lines 76, 79 with the inlet valve 80 and by way of the line 81 with the wheel cylinder 82 of the wheel brake 83. During the anti-lock control mode, the wheel cylinder 82 is connectable temporarily, and namely as dictated by the control algorithm, with an unpressurized supply reservoir 85 by way of an outlet valve 84. The supply reservoir 85 and the supply reservoir 86 on the suction side of the pump may form a structural unit.

The inlet valve 80 and the outlet valve 84 are electromagnetically switchable valves. The inlet valve 80 is open in the de-energized state of the actuating magnet. Therefore, it is termed as "valve, open in its de-energized state" or "SO-valve". The outlet valve 84 is closed in the de-energized state of the actuating magnet. Therefore, it is termed as "valve, closed in its de-energized state" or "SG-valve". The switching of these valves is performed by output signals of the electronic control unit which latter is described in the cited U.S. Pat. No. 4,826,255.

A control algorithm is contained in memory in the electronic control unit which dictates the switching of SO-valves and SG-valves, as will be explained in greater detail hereinbelow. From the switching arrangements of the SO-valves and the SG-valves, the phases for the anti-lock control mode are performed, in which the pressure in the wheel cylinder is reduced, is maintained constant and re-increased. Pressure reduction is accomplished by closing the inlet valve 80 and by opening the outlet valve 84. The pressure is maintained constant by closing the inlet valve 80 and by keeping the outlet valve closed 84. Pressure build-up is attained by an open inlet valve 80 and a closed outlet valve 84.

During each cycle of pressure reduction, a volume of fluid is removed according to the control algorithm out of the line system and out of the master cylinder connected to the line system by discharge through the open SG-valve. The accumulative amount of fluid discharging over a number of pressure reduction cycles can be so large that the output of the pump is insufficient to compensate for the exiting fluid volume. The piston 68 and the brake pedal 69 coupled to the piston 68 therefore move to the left in an undesirable fashion under the effect of the pedal force. In the extreme case, the brake pedal will "depress through its full travel". The piston will then assume the left-hand end position C illustrated in FIG. 1.

The sensing device senses the actual position of the piston 68 and, as previously described, its direction of movement and its speed. By way of a signal line, these data are supplied as input signals to the electronic control unit. After these input signals have been processed, the electronic control unit provides output signals in response thereto for controlling the rate of delivery of the pump 74. As previously mentioned, the control of the rate of delivery can be performed electrically by means of the electric drive or by virtue of mechanical means. The thus controlled increased rate of delivery propagates during the control mode at least partly through the line 77 into the pressure chamber 87 of the master cylinder. Thereby, the piston 68 is displaced out of its actual position, for example, the undesirable end position C, into the desirable nominal position B. If required, the working piston can be moved in a corresponding fashion out of the extreme right-hand position, position A, into the desired mid-position, position B. To this end, the rate of delivery must be reduced correspondingly. Similarly, corresponding electric signals are supplied by the sensing device to the electronic control unit. The latter processes these signals according to a control algorithm, which is adapted to specific customer requirements, to form corrective signals for the output of the pump.

As is apparent from the preceding description, a circular sequence of operation in the sense of a control circuit is performed. The sensing device is the measuring means of the control circuit which is arranged at the end of the control course relative to the pump/master cylinder piston. In terms of control technology, the sensor signals of the sensing device are input signals of a control device which is designed as an electronic control unit in the instant disclosure. In the control device, a control input in the form of a control algorithm is provided for obtaining a nominal position of the piston. Processing the input signals according to the algorithm results in corrective variables at the outlet of the control device. These corrective variables and/or output signals adjust the rate of delivery which is necessary for positioning the piston in the nominal position. The pump with its variable rate of delivery functions as a correcting element in terms of control technology. Thus, the described control cycle ensures a balance between the volume discharging from the pressure chamber of the master cylinder and the flow rate of the pump. It should now be apparent from the preceding explanations that the position of the working piston in the master cylinder can be utilized as evidence of the proper or faulty operation of the entire anti-lock control system.

In addition to the actual position ascertained by the sensing device, piston speeds determined by the sensing device manifest a proper or faulty operation of the anti-lock system. Movement of the piston to the left implies, for example that there may be a defect. A rapid movement to the left can mean that there is a major defect, for instance a pipe burst or an undesirable throttling of the fluid flow on the suction side of the pump.

In accordance with the present invention, a straightforward inexpensive brake-power-booster and master-cylinder assembly with sensing device of small overall dimensions is provided which fulfills the above-mentioned objects. Moreover, the attachment of the sensing device does not enlarge the overall size of the assembly. The embodiments of the present invention according to the FIGS. 3, 4 and 5 are directed to an anti-lock device furnished with a vacuum brake power booster, see FIG. 2. The device according to FIG. 2 comprises the following units: a vacuum brake power booster 9 operated by the brake pedal 1, a tandem master cylinder 16, a modulator 2 for the pressure control in the anti-lock mode, an electronic control unit 5 for processing sensor signals as well as a hydraulic pressure pump 8 which is driven by an electric motor 7. The brake system is shown in its release position in FIG. 2. The pressure chambers 10, 15 of the master cylinder communicate in a known manner with the pressure-fluid supply reservoir 3 by way of open central control valves, by way of connecting ducts in the interior of the pistons and by way of an annular chamber in the intermediate piston, by way of bores and by way of hydraulic lines 19, 20.

The two pressure circuits 21, 22 of the master cylinder are connected to the wheel brakes 27, 28, 29, 30 by way of electromagnetically actuatable valves which are open in their initial position, so-termed SO-valves (SO=opened in their de-energized state) or inlet valves 23, 24, 25, 26. The parallel connected wheel brakes 27, 28 and 29, 30, respectively, are allocated to the diagonally arranged pressure circuits (brake circuits) 21, 22.

For the arrangement of the vehicle wheels allocated to the described brakes, the following short terms are used: VL for front left, HR for rear right; VR for front right, and HL for rear left wheel. The wheel brakes 27, 28, 29, 30 are connectable further by way of electromagnetically actuatable outlet valves 31, 32, 33, 34, so-termed SG-valves (SG=closed in their de-energized state) which shut off in their initial position, by way of the line 4 with the supply reservoir or pressure-compensating reservoir 3.

The vehicle wheels are equipped with sensors 36, 37, 38, 39 which cooperate with toothed discs co-rotating synchronously to the wheel rotation and which generate electric signals indicative of the wheel rotational behavior, that is the wheel rotational speed and variations of this speed. These signals are fed by way of the inputs 40, 41, 42, 43 to the electronic control unit 5. This electronic control unit processes the sensor signals on the basis of a control algorithm memorized in it to form output signals (braking pressure control signals) which, in the braking pressure control mode, serve to operate the SO-valves and SG-valves, with the result that the braking pressures are decreased, are kept constant or re-increased in the individual wheel cylinders or the disc brakes corresponding to the control algorithm. To this end, the actuating magnets of the SO-valves and SG-valves are driven by way of the outputs 44, 45, 46, 47 of the electronic control unit. For clarity electrical connecting lines between the outputs 44, 45, 46, 47 and the coils of the SO-valves and SG-valves are not illustrated in the Figures.

In the braking pressure control mode, the electric motor 7 of the pump 8 is put into operation. The switch-on signal is applied on the motor by the output 48 of the electronic control unit 5. In the control mode, the pump develops pressure in the pressure lines 49, 50, 51. These lines represent a pressure fluid conduit which is connected with the pressure fluid conduit of the tandem master cylinder, i.e. the pressure lines 21, 22. That is, in the control mode, the pressure chambers 10, 15 of the tandem master cylinder are pressurized by the pump. Upon brake application in the normal braking mode, the pedal force F is transmitted onto the master cylinder pistons boosted by the vacuum in the booster 9. The central control valves in these pistons will close, thus allowing braking pressure to develop in the pressure chambers 10, 15 and hence in the brake circuits 21, 22 which propagates by way of the SO-valves 23, 24, 25, 26 to the wheel brake cylinders.

On detection of an imminent locked condition at one or more of the wheels by means of the sensors 36, 37, 38, 39 and the electronic control unit 5, the anti-lock control mode will commence. The drive motor 7 of the pump 8 is switched on, whereby pressure develops in the pressure lines 49, 50, 51 which, on the one hand, is applied on the wheel cylinders of the wheel brakes by way of the SO-valves and, on the other hand, pressurizes the pressure chambers of the master cylinder, as is illustrated. As a result of the control algorithm, further signals of the electronic control unit cause change-over of the electromagnetically actuable SO-valves and SG-valves.

The pump pressure in the working chambers 10 and 15 cause the working pistons 11 and 12 in FIG. 1 to displace to the right. The push rod piston 11 moves as far as its right-hand stop 6 (FIG. 2) as in known brake power boosters. As a result, the brake pedal 1 is reset, and it assumes its initial position. That is, the driver's foot pushes against a reset pedal. In this position, the central valves of the push rod piston 11 and of the intermediate piston 12 will open. Pressure fluid can flow back by way of these central valves into the supply reservoir 3 in a known manner by way of the return lines 19 and 20. With regard to the intermediate piston, this is effected by way of the unpressurized annular chamber 17 of the intermediate piston. In regard to the push rod piston, this is effected by way of the unpressurized supply chamber 13, and the supply bore 14 into the return line 20. During the entire control mode, the working pistons are retained in their initial position. Likewise the brake pedal is retained in its initial position during the entire control mode. Retention of the pistons and pedal in the initial position may be avoided in accordance with the present invention and by virtue of the embodiments according to FIGS. 3, 4 and 5. Instead, the push rod piston is allowed to be moved by pedal pressure to assume the nominal position B of FIG. 1 during the ant-i-lock control mode. This shift to a nominal position is created by outflow from the master cylinder. It is thus accomplished thereby that the brake pedal is positioned forward of its initial position during the control mode.

FIG. 3 illustrates a switching arrangement according to the present invention for sensing the push rod piston and for actuating a switch. Upon actuation of the switch, an electrical signal is issued to the electronic control unit of the anti-lock device. The rotational speed of the drive motor for the pump and thus the pump output is controlled by the control unit in response to the switch signal and corresponding to the control algorithm provided in the control unit. It also can be provided that the control unit switches the drive motor on and off in response to the switch signal and corresponding to the control algorithm in order to vary the rate of delivery of the pump.

The device for sensing the push rod piston and for actuating the switch includes a flexible transmitter known as a Bowden cable 54 and also a trigger cam 64, the core 53 of the Bowden cable 54 being drawn through the diaphragm plate 52 of the vacuum brake power booster. It can be seen from FIG. 3 that the core 53 of the Bowden cable 54 is attached to the diaphragm plate 52. This Bowden cable 54 is vacuum-tightly fitted on the housing 56 of the vacuum brake power booster by way of the member 55. When the brake pedal is applied, the piston rod 57 displaces in the direction of the arrow 58. The known vacuum control valve which, generally referred to at 59 generates a difference in pressure between the chambers 60, 61. Caused by this difference in pressure, the diaphragm plate moves in the direction of the arrows 62, 63 to the left. In doing so, the core of the Bowden cable 54 is drawn into the brake power booster device. Fastened to the end of the core 53 is a trigger cam 64 with a switching ramp 88. This trigger cam 64 is moved in the direction of the arrow 65 in opposition to the effect of the resetting spring 66. After the distance 67 has been overcome, the trigger cam bears against the limit switch 18 and actuates the same. As is described above, an electrical signal is initiated by the switch which is supplied further to the electronic control unit of the anti-lock device.

The electronic control unit processes this switch signal to form an output signal. By way of this output signal, either the rotational speed of the drive motor of the pump is regulated, or the drive motor is switched on and off. This accomplishes the desired variation of the flow rate of the pump and thus the desired positioning of the push rod piston, see FIG. 1. The resetting spring 66 insures that the Bowden cable 54 remains under tension.

FIGS. 4 and 5 illustrate a vacuum brake power booster 89 and a tandem master cylinder 90. As previously discussed, it is an object of the present invention to provide a unit consisting of a booster and master cylinder with a travel-responsive switch for the auxiliary pump without enlarging the overall size of the entire assembly.

The travel-responsive switch is actuated when the diaphragm plate has covered a predetermined distance. When the travel-responsive switch is actuated, it produces an input signal for the electronic control unit of the anti-lock device. After this input signal has been processed, the electronic control unit supplies switch signals for the pump drive.

Caused by the rate of delivery of the pump, one or both of the working pistons of the master cylinder and thus the brake pedal are positioned forward or to the left of their initiator inactive position shown in FIG. 1 as has been explained.

In FIG. 4, a vacuum-tight device 91 accommodates a microswitch 92 which cooperates with a roller-type lever 93. When the rolling diaphragm 94 moves to the left upon operation of the brake power booster, it actuates the roller-type lever 93. The roller-type lever 93 subsequently scans the position of the rolling diaphragm 94 and thus the position of the push rod piston and the position of the brake pedal which is coupled to the push rod piston in terms of effect. In a known manner, the rolling diaphragm is urged to the left by the introduced atmospheric pressure, and in FIG. 4, after the distance 95 has been overcome, against the roller of the roller-type lever. The roller-type lever switch can be adjusted to the nominal position, e.g. 25 percent actuating travel. The brake pedal is positioned in this position during the anti-lock control mode.

In the embodiment according to FIG. 5, a reflection light barrier is used which is accommodated in the vacuum-tightly fitted housing 96. The rolling diaphragm 97 is furnished with a reflection foil 98 or with a color point, either one of which reflects the light of the emitter of the reflection light barrier device. That is, the position of the rolling diaphragm is scanned in a non-contact manner. Instead of the light barriers, other types of sensors likewise can be used, for instance an inductive or a capacitive sensor. In particular, a light emitter 99 and a light receiver 100 are incorporated in the housing 96. The arrow 101 indicates the light emission. The arrow 102 indicates the reflected light. The dashed line 98 represents the reflection foil. When the rolling diaphragm is rolled off along the distance 106, a reflection of the light and thus a switching action takes place.

Reference numeral 103 in FIG. 5A designates an approach sensor of the capacitive type. It is mounted in the housing wall 104 of the vacuum brake power booster. Its purpose is to scan the position of the diaphragm plate 105. The switching point for switching on the pump can be adjusted by variation of the mounting position of the approach sensor 103 or electronically by varying the sensitivity of the sensor. Basically, other types of sensors and other switches also can be used. Thus, a mechanical limit switch or travel-responsive switch 107 is schematically illustrated in FIG. 5B which is directly operable by the diaphragm plate 105. The approach sensor can also be of the inductive type. The functional principle of the inductive approach switch, which principle is known in the art, advantageously utilizes an alternating electromagnetic field disturbed by a metal object, herein the diaphragm plate 105, which interferes with the alternating field. The approach sensor of the capacitive type can be a capacitive approach switch, its function the capacitance of a condensor is disturbed. That is, when an object is moved into the electric field of the condenser, a switching action is initiated by the disturbance of its capacitance.

What is claimed is:

1. A braking pressure control system having a slip control mode for a hydraulic brake system for automotive vehicles having a brake pedal, a master cylinder having at least one working piston and a working chamber supplied with fluid able to be pressurized by stroking of said working piston, means operatively coupling said brake pedal and said working piston to allow stroking by advance of said brake pedal from an initial return position to an advanced end position, wheel cylinders, said working chamber in communication with said wheel cylinders to generate a fluid pressure therein, said system further having at least one pump having an output flow directed to an outlet in communication with said working chamber for supplying hydraulic fluid to controllably position said at least one working piston of said master cylinder, said pump including means for varying said output flow therefrom, a pressure modulator modulating said fluid pressure in said wheel cylinders during said slip control mode, said pressure modulator including an opening valve and a shut off valve for each wheel cylinder, said system also including wheel sensors for generating signals indicating wheel slip and an electronic control unit processing said wheel sensor signals to form corrective signals for operating said opening valves and shut-off valves of the pressure modulator, said system further including a brake power booster composed of a booster housing and a diaphragm in said booster housing mounted to be able to be advanced to various positions therein, and means for controllably creating a pressure difference across said diaphragm to generate a booster force, means for coupling said diaphragm to said working piston to assist brake pedal stroking thereof by said generated force, switch means responsive to said position of said diaphragm to actuate said pump at a varying output level in correspondence with said position of said diaphragm corresponding to said position of said working piston from said initial return position to said advanced end position.

2. A braking pressure control system as claimed in claim 1, wherein said diaphragm has a rolling lip and wherein said switch means includes a switch operated by engagement with said rolling lip after advance of said diaphragm in said booster housing a predetermined distance in the direction of brake application.

3. A braking pressure control system as claimed in claim 2, wherein said switch means includes a mechanical limit switch mounted in said booster housing, said mechanical limit switch including a roller type lever actuatable by said rolling lip of said diaphragm.

4. A braking pressure control system as claimed in claim 2, wherein said switch includes a magnetic limit switch incorporating a reed contact, actuatable by said rolling lip of said diaphragm, said rolling lip carrying a magnetized section.

5. A barking pressure control system as claimed in claim 2, wherein said switch includes a photo-electric switch mounted in said booster housing, a portion of said rolling lip forming a light barrier, after a predetermined advance of said diaphragm in the direction of brake application.

6. A brake pressure control system as claimed in claim 5, wherein a reflective portion is formed on said rolling lip of said diaphragm adapted to operate said photoelectric switch.

7. A brake pressure control system as claimed in claim 2, wherein an approach sensor is arranged in the housing which comprises said switch and which provides an electric signal upon approach of said diaphragm.

8. A brake pressure control system as claimed in claim 7, wherein said approach sensor comprises a capacitive sensor arranged in said booster housing, wherein a metal plate is attached to said diaphragm, and wherein said capacitive sensor provides an electric signal upon approach of said metal plate.

9. A brake pressure control system as claimed in claim 7, wherein said booster further includes a metal plate attached to said diaphragm and wherein said approach sensor includes an alternating electromagnetic field disturbed by the approach of said metal plate.

10. A brake pressure control system as claimed in claim 7, wherein said diaphragm has a plate attached thereto, wherein said approach sensor includes a condenser having an electric field, the capacitance thereof disturbed by the approach of said diaphragm plate.

11. A braking pressure control system as claimed in claim 1 wherein said switch means includes a Bowden cable having a core attached to said diaphragm.

12. A braking pressure control system as claimed in claim 11, wherein said switching means includes a travel-responsive switch and a cam member movable by said Bowden cable core and further including a switching ramp on said cam member which actuates said travel-responsive switch after a predetermined movement of said cam member.

13. A brake pressure control system as claimed in claim 1, wherein said switch means comprises a mechanical travel-responsive switch having an element in engagement with said diaphragm to be shiftable therewith so that said switch is actuatable by said diaphragm.

* * * * *